March 12, 1968
S. A. SEYMOUR ET AL
3,372,818
SILO UNLOADER IMPELLER
Filed Aug. 24, 1966
3 Sheets-Sheet 1
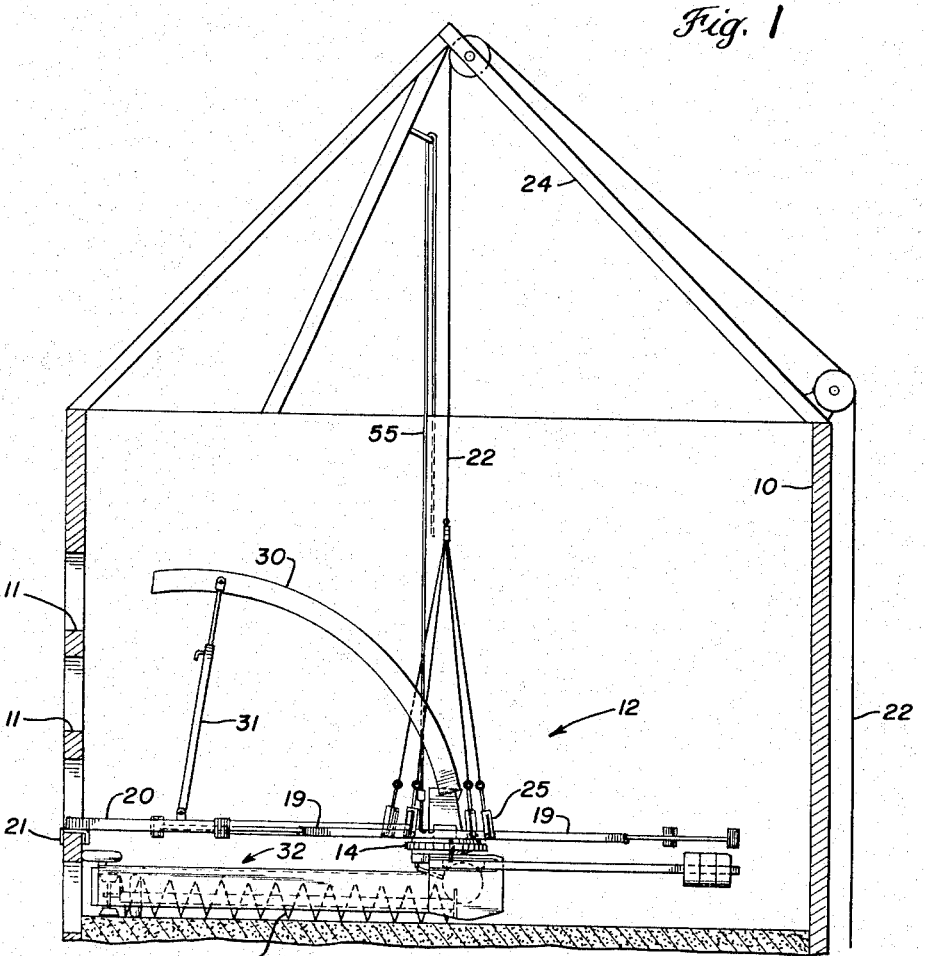
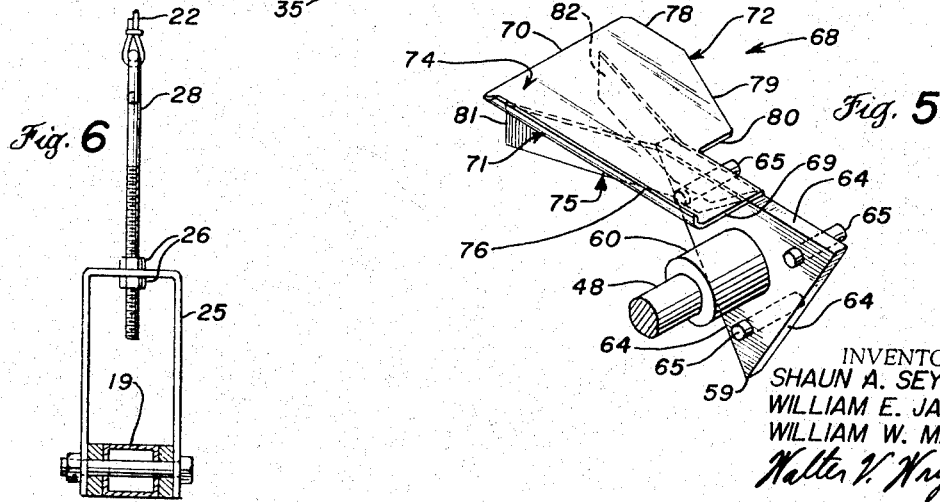
INVENTOR.
SHAUN A. SEYMOUR
WILLIAM E. JAMES
WILLIAM W. MANN
Walter V. Wright

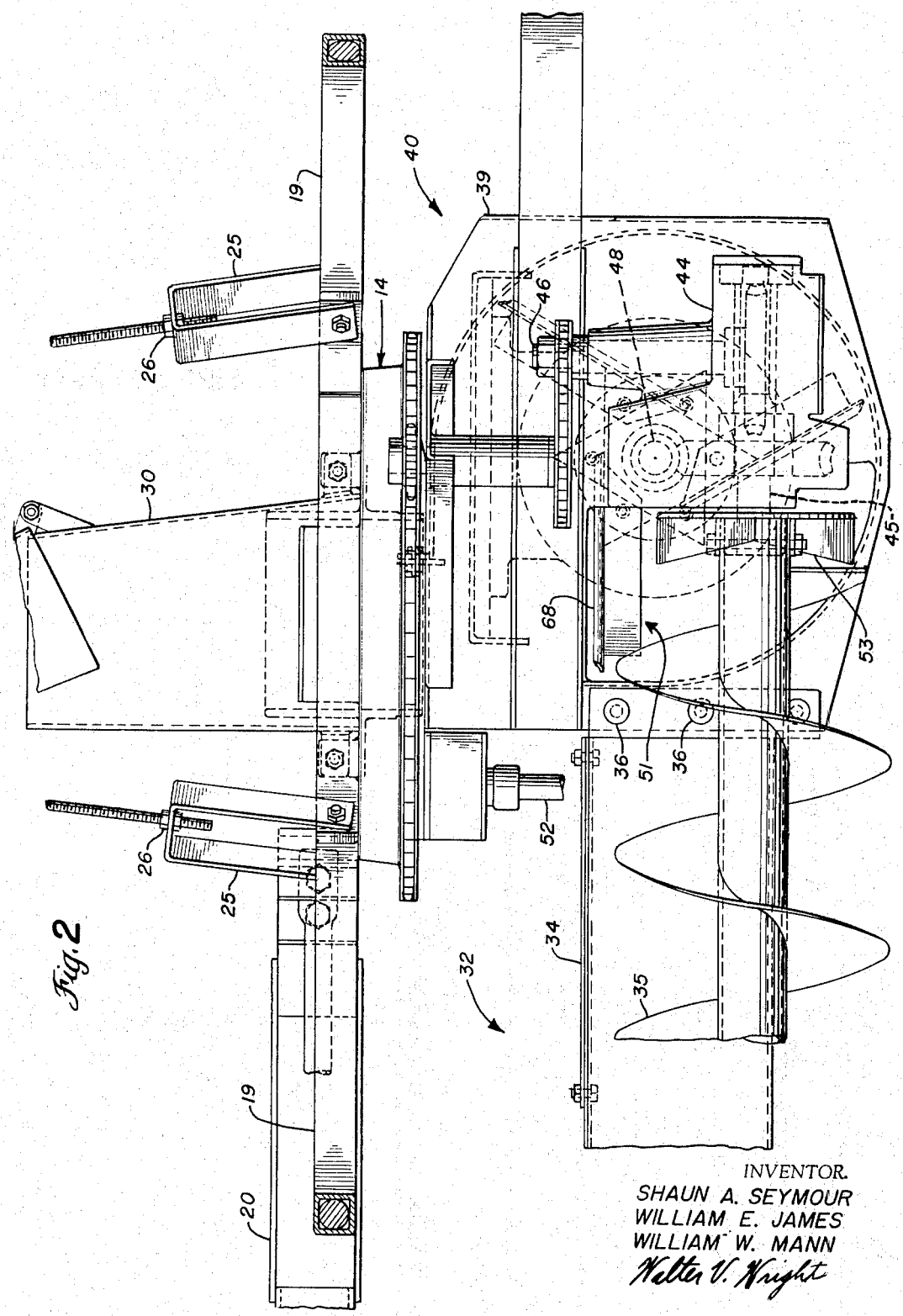

March 12, 1968   S. A. SEYMOUR ET AL   3,372,818
SILO UNLOADER IMPELLER

Filed Aug. 24, 1966   3 Sheets-Sheet 3

INVENTOR.
SHAUN A. SEYMOUR
WILLIAM E. JAMES
WILLIAM W. MANN

Walter V. Wright

United States Patent Office

3,372,818
Patented Mar. 12, 1968

3,372,818
SILO UNLOADER IMPELLER
Shaun A. Seymour, Ephrata, Pa., William E. James, Dijon, France, and William W. Mann, Talmage, Pa., assignors to Sperry Rand Corporation, New Holland, Pa., a corporation of Delaware
Filed Aug. 24, 1966, Ser. No. 574,626
6 Claims. (Cl. 214—17)

This invention relates generally to silo unloaders. More particularly, it relates to silo unloaders of the type intended to operate on the top surface of material in a silo, as opposed to bottom unloaders which are disposed on the silo floor under the column of silage.

Top silo unloaders generally include a frame structure on which is mounted a discharge spout. The spout extends from the center of the silo radially outwardly toward the vertical column of access doors normally provided in silo walls. Gathering means, usually in the form of a sweep auger, is provided on the frame structure and travels over the surface of the column of silage gathering the silage into the center of the silo. Another element which is usually provided on the base frame structure of a silo unloader is a blower or impeller unit to receive the silage from the gathering means and impel it through the discharge spout. The present invention is primarily concerned with an improved rotary impeller unit particularly intended for use in a silo unloader combination.

It is an object of this invention to provide a silo unloader rotary impeller design providing high operating efficiency at low manufacturing and operating cost.

It is another object of this invention to provide a silo unloader rotary impeller design affording high material impelling capacity in a unit of small over all size.

It is another object of this invention to provide a mechanically simple silo underloader rotary impeller of compact rugged design which is insensitive to shock loads and has an extended maintenance-free service life.

These and other objects and advantages of this invention will be more apparent upon reference to the following description and claims taken in conjunction with the accompanying drawings wherein:

FIG. 1 is a vertical sectional view of the top portion of a silo showing therein a silo unloader having an impeller unit constructed in accordance with the principles of the present invention;

FIG. 2 is an enlarged fragmentary elevational view of a portion of the silo unloader seen in FIG. 1;

FIG. 5 is an isometric view of a portion of the impeller illustrating details of construction; and FIG. 6 is an enlarged detail view of part of the silo unloader suspension mechanism.

Figure 4:
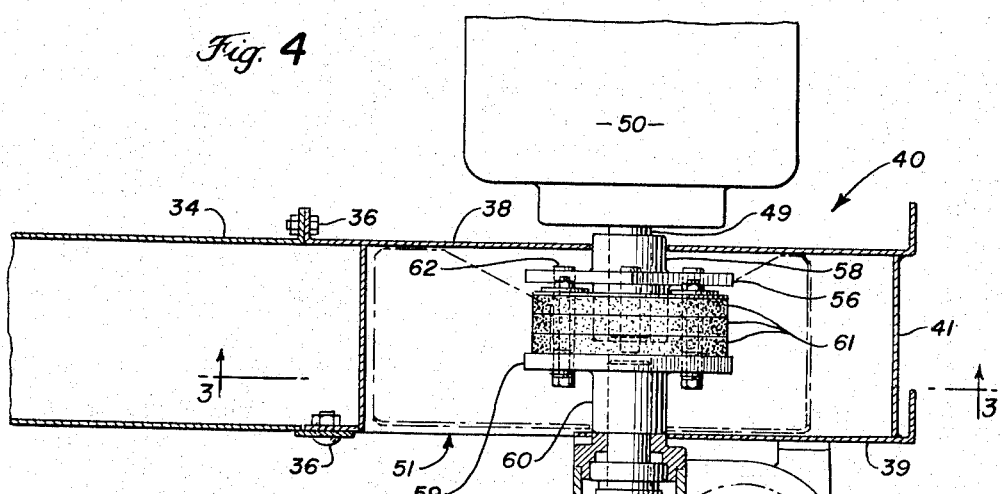
FIG. 4 is a sectional view taken on the line 4—4 of FIG. 3.

Referring now to the drawings in detail, FIG. 1 shows a conventional cylindrical silo 10 having the usual vertical column of access openings 11 in the wall and including a silo unloader generally indicated by the reference numeral 12.

Figure 3:
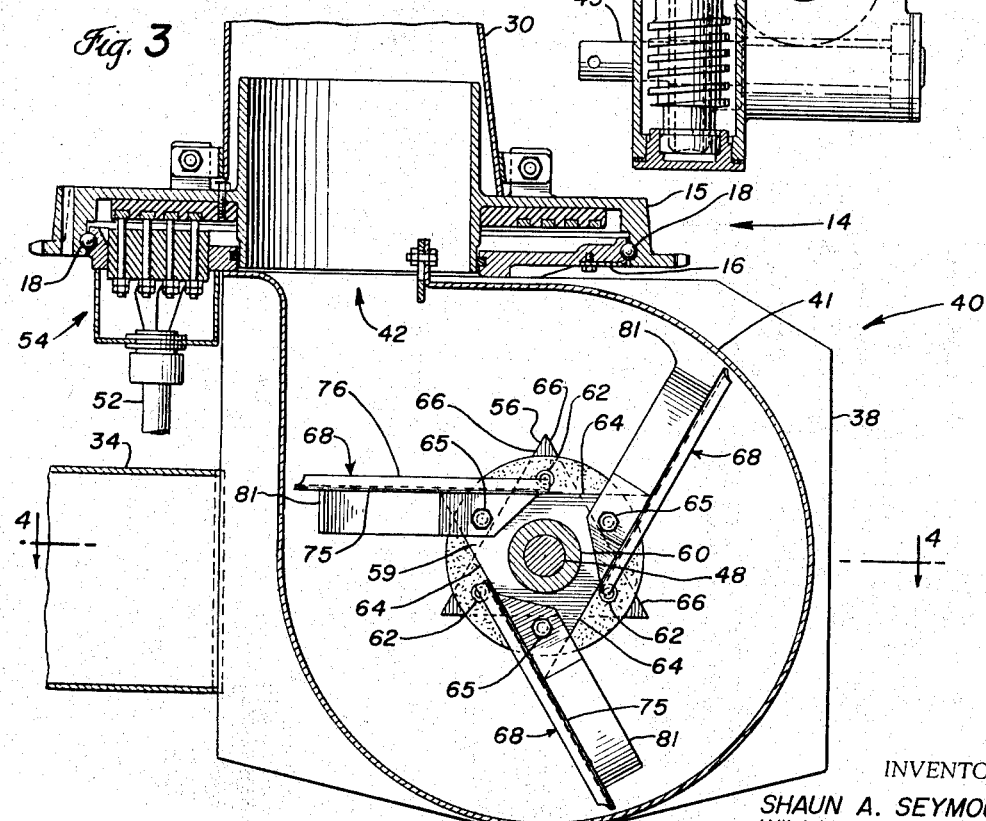
FIG. 3 is a vertical sectional view of the impeller unit of the present invention taken on the line 3—3 of FIG. 4.

At the heart of the silo unloader frame is a large diameter ball bearing journal 14. In FIG. 3, the outer and inner races 15 and 16, respectively, and interposed ball bearings 18 are visible. Referring again to FIG. 1, mounted on the outer bearing race 15 are a plurality of arms 19 which extend radially outwardly to the silo wall and center the journal 14 in the silo. The customary torque arm 20 is also mounted on outer bearing race 15. The outer end of torque arm 20 is bracketed at 21 to the sill of one of the access openings 11 to prevent the outer journal race 15 from rotating relative to the silo. These elements are well known in the silo art, as is the suspension means comprising a cable 22 which extends upwardly from the ground along the outside of the silo to a tripod structure 24 atop the silo and downwardly inside the silo where it supports the silo unloader 12 by way of a plurality of cable anchoring brackets 25. It will be readily apparent from FIG. 6 that the silo unloader may be leveled by manipulation of the adjusting nuts 26 to raise or lower the cable anchoring eye-bolts 28 relative to the cable anchoring brackets 25. A discharge spout 30 is mounted on the outer journal race 15 as may be seen in FIGS. 2 and 3. An adjustable support rod 31 (FIG. 1) supports the outer end of the discharge spout 30 from torque arm 20 with the spout directed at one of the silo access openings 11.

In FIG. 1, the usual silage gathering auger assembly 32 may be seen. This assembly includes a frame arm 34 (see FIGS. 2, 3, and 4) extending radially outwardly from the center portion of the silo unloader to provide a mounting point for the radially outer end of a gathering auger 35. A portion of the gathering auger 35 is shown in FIG. 2. Referring now to FIGS. 3 and 4, the gathering auger frame arm 34 is bolted at 36 to the end wall plates 38 and 39 of a rotary impeller housing which is generally indicated by the reference numeral 40. Housing 40 includes an arcuate wall 41 extending between the planar end walls 38 and 39 and defining a discharge opening 42 (FIG. 3) communicating with the receiving end of the discharge spout 30. The housing 40 is fixedly attached to the inner race 16 of journal 14.

A gearbox 44 (FIG. 4) is mounted on the impeller housing wall 39 and includes a first output shaft 45 to rotate the gathering auger 35 and a second output shaft 46, which through various chains and sprockets visible in FIG. 2 but not constituting a part of the present invention, causes the inner journal race 16, the impeller housing 40 mounted thereon, and the gathering auger frame arm 34 attached to housing 40, to rotate relative to outer journal race 15. Driving power is delivered into gearbox 44 (FIG. 4) by an input shaft 48 which is coupled to the shaft 49 of an electric motor 50 within the impeller housing 40 as will be more fully described hereinafter.

In FIGS. 2 and 4 it may be seen that an inlet opening 51 is formed in impeller housing end wall 39 alongside the radially inner end of gathering auger 35. A paddle member 53 (FIG. 2) on the auger shaft drives material gathered by auger 35 into housing 40 through the inlet opening 51. Inlet opening 51 is spaced from the outlet opening 42 and located generally below it. It will be apparent that electric current may be supplied to motor 50 through a conduit 52 (FIGS. 2 and 3) via conventional electric rings and brushes generally indicated by the reference numeral 54 in FIG. 3 from a source of current outside the silo. The usual electric cable 55 (FIG. 1) delivers current to the electric ring and brush assembly.

Referring to FIGS. 3 and 4, a triangular shaped plate 56 has an integral hub 58 mounted on the end of motor shaft 49 inside impeller housing 40. Another triangular plate 59 with an integral hub 60 is fixed to the end of the input shaft 48 of gearbox 44 inside impeller housing 40. The motor shaft 49 and a gearbox input shaft 48 are coaxial and their common axis is also the axis of rotation of the rotary silage impeller disposed within housing 40. The plates 56 and 59 are parallel to each other, perpendicular to the axis of rotation of the motor and gearbox input shafts, and spaced apart in the direction of extent of the axis. As may be seen in FIG. 3 the two triangular plates are also angularly oriented approximately 60 degrees out of phase with each other. A plurality of fiber rings 61 are interposed between the plates 56 and 59. A first series of three bolts 62, extend through triangular plate 56 at the vertices of the angles. These bolts extend through the fiber rings 61 but lie outside the straight edges 64 of the triangular plate 59. A second series of three bolts 65 extend through triangular plate 59 at the vertices of the angles, as indicated in FIG. 5. These bolts extend through the fiber rings 61 but lie outside the straight edges 66 of the triangular plate 56 (FIG. 3). In this manner the two triangular plates 56 and 59 are drivingly coupled together to provide a sturdy journal for the silage impeller, while the fiber rings 61 serve to dampen and absorb shock loads imposed on the drive mechanism during operation.

The impeller comprises three identical paddle members 68. It will be apparent from FIGS. 2 and 3 that the direction of rotation of the impeller is clockwise in these figures to move the paddles 68 upwardly past the impeller housing inlet opening 51 toward the discharge opening 42. The three paddles 68 are mounted on the triangular plate 59, one paddle along each of the three straight edges 64. As may be seen in FIG. 5, the paddle blades 68 extend outwardly from the axis of rotation of the impeller and have proximate and distal ends 69 and 70, respectively, relative to the axis of rotation. Each paddle also has a first side 71 and a second side 72 which are, respectively, disposed adjacent the end walls 39 and 38 of the housing 40. Each paddle has a leading planar surface 74 and a trailing planar surface 75 relative to the direction of rotation of the paddles. In FIG. 5 the leading surface is the surface facing upwardly while the trailing surface is the surface facing downwardly. The first side 71 of each of the paddles extends in a straight line parallel to housing wall 39 wherein the inlet opening 51 is located. A right angle flange 76 extends along the first side of each paddle between the proximate and distal ends thereof and is turned upwardly so that it leads the leading surface 74 of the paddle as the paddle rotates. The second side 72 of each paddle has a first portion 78 (FIG. 5) adjacent the distal end 75 of the paddle, which extends parallel to the first side of the paddle and parallel to housing wall 38. Second paddle side 72 has a second portion 79 which tapers from first portion 78 toward the first side 71 between the first portion 78 and the proximate end 69 of the blade. As may be seen in FIG. 5, the second portion 79 of the second side 72 of the blade is notched at 80 to clear the fiber discs 61.

The manner in which the paddle blades 68 are attached to the triangular plate 59 is discernible from FIGS. 3 and 5. A pair of elongated braces 81 and 82 extend along the trailing surface of each blade 68 and are affixed thereto. As may be seen in FIG. 5, the braces have portions lying along the opposite sides of triangular plate 59 and receive therethrough the bolts 65 which assemble the impeller journal mechanism. The trailing surface 75 of each paddle blade rests upon one of the straight edges 64 of plate 59. The braces 81 and 82 extend parallel to each other along the portions thereof lying along the sides of plate 59 and then diverge toward the respective first and second sides of the blade toward the distal end 70 thereof. The plate 59, paddle blades 68, and braces 81 and 82 are preferably welded together into a single integral unit.

In operation, as the paddles 68 move upwardly past the inlet opening 51 of impeller housing 40, the flanges 76 of the paddles cleanly separate the material inside housing 40 from the material still lying outside of the housing. When the paddles strike the material there is an initial impact that tends to splatter the material along the leading surface 74 of the paddle. The flange 76 prevents the material from being thrown back out through the housing inlet opening 51 upon occurrence of this initial impact splattering. The fiber rings 61 perform an impact cushioning functioning which helps to reduce the initial impact splatter of the material and facilitate its movement radially outwardly from the axis of rotation toward the distal end 70 of the paddle blade. The second, or tapered, portion 79 of second paddle side 72 facilitates radially outward movement of any material that happens to be draped over the end portion 79 of the second side of the paddle. The reduction of surface area of the paddles adjacent the housing wall 38 and the impeller shaft, afforded by the tapered edges 79, also reduces the amount of material that otherwise may be carried around the shaft by the paddles. The construction of the impeller paddles minimizes loss of material after it has contacted a paddle and facilitates movement of the material along the leading surfaces of the paddles toward the distal ends to extract maximum benefit from the centrifugal force of the impeller while minimizing the amount of material that is carried around the impeller shaft by the paddles.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. In a silo unloader having a frame, a discharge spout and silage gathering means on said frame, means to receive silage from said gathering means and impel said silage through said spout comprising, a housing on said frame having an arcuate wall defining a discharge opening communicating with said spout, said housing having first and second end walls the first of which defines an inlet opening spaced from said discharge opening and disposed to receive silage from said gathering means, rotary impeller means disposed in said housing and having a central axis of rotation, means journalling said impeller means in said housing end walls for rotation about said axis, drive means rotating said impeller means in a predetermined direction about said axis, said impeller means comprising a plurality of paddle blades each having proximate and distal ends relative to said axis of rotation, said blades each having first and second sides disposed respectively adjacent said first and second housing end walls and extending between said proximate and distal ends, said blades each having leading and trailing surfaces relative to said predetermined direction of rotation, said first sides of said blades lying in a plane parallel to said first end wall of said housing, each of said blades having a flange thereon extending along said first side of the blade generally parallel to said first end wall of said housing and perpendicular to said leading surface of the blade, said flange on each of the blades projecting ahead of said leading surface relative to said direction of rotation, said second sides of said blades having first portions adjacent said distal ends and second portions extending from said first portions to said proximate ends, said first portions extending parallel to said first sides and said second portion converging generally toward said first sides between said first portions and said proximate ends, and means engaging said trailing surfaces of said blades and attaching the blades to said journalling means.

2. In a silo unloader as recited in claim 1, said impeller journalling means comprising a first shaft, a first plate fixedly mounted on said first shaft and lying in a plane perpendicular to the axis of said shaft, said plate having a plurality of straight edges, a portion of said trailing surface of each of said blades adjacent said proximate end thereof and intermediate said first and second sides respectively engaging one of said edges of said plate, said means engaging said trailing surfaces of said blades and attaching the blades to said journalling means comprising a pair of elongated braces for each blade, each pair of braces respectively bearing against the trailing surface of one of said blades and having portions lying along opposite sides of said plate adjacent one of said edges, and a bolt for each blade extending through said plate and both of said braces parallel to said shaft.

3. In a silo unloader as recited in claim 2, said portions of each pair of braces lying along opposite sides of said plate extending parallel to each other and said plate, each pair of braces having portions extending outwardly beyond said plate along the trailing surfaces of the blades, said outwardly extending portions of each pair of braces diverging from each other toward said first and second sides of said blades adjacent said distal ends.

4. In a silo unloader as recited in claim 2, said drive means comprising a second shaft coaxial with said first shaft and having a drive plate fixed thereon, said drive plate being parallel to but spaced from said first plate along said axis, resilient means interposed along said axis between said first plate and said drive plate, means fixing said drive plate to said resilient means at angularly spaced locations about said axis, and means fixing said first plate to said resilient means at angularly spaced locations about said axis.

5. In a silo unloader as recited in claim 2, said first plate being of equi-angular triangular configuration, said blades being three in number angularly spaced apart one hundred twenty degrees and extending respectively along the respective edges of said triangular plate.

6. In a silo unloader as recited in claim 1, said means engaging said trailing surfaces of said blades and attaching the blades to said journalling means comprising braces extending outwardly from said journalling means and rearwardly relative to said direction of rotation thereby fixing said blades to said journalling means with said proximate ends of each of said blades disposed ahead of said distal ends relative to said predetermined direction of rotation.

References Cited
UNITED STATES PATENTS

| | | | |
|---|---|---|---|
| 2,324,042 | 7/1943 | Swenson | 302—37 |
| 3,079,016 | 2/1963 | Dretzke | 214—17.84 |

ROBERT G. SHERIDAN, *Primary Examiner.*